United States Patent
DeJana et al.

(10) Patent No.: US 10,572,915 B2
(45) Date of Patent: Feb. 25, 2020

(54) TRANSACTION MANAGEMENT BASED ON INDIVIDUAL ORDERS OR NUMBER OF DEVICES AT TABLE FOR DESIRED DISTRIBUTION

(75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 13/531,180

(22) Filed: Jun. 22, 2012

(65) Prior Publication Data

US 2013/0346243 A1   Dec. 26, 2013

(51) Int. Cl.
*G06Q 40/00*  (2012.01)
*G06Q 30/06*  (2012.01)

(52) U.S. Cl.
CPC .................................... *G06Q 30/06* (2013.01)

(58) Field of Classification Search
CPC ..................................................... G06Q 40/00
(Continued)

(56) References Cited

U.S. PATENT DOCUMENTS

| | | | | |
|---|---|---|---|---|
| 2005/0018895 A1* | 1/2005 | Kawano | ..................... | G06T 7/11 382/132 |
| 2008/0208681 A1* | 8/2008 | Hammad | ............. | G06Q 20/045 705/13 |

(Continued)

FOREIGN PATENT DOCUMENTS

| | | |
|---|---|---|
| CN | 101014985 | 8/2007 |
| EP | 2182493 | 5/2010 |

(Continued)

OTHER PUBLICATIONS

"Know Your Cell—Split Bill Review," http://www.knowyourcell.com/app-reviews/iphone-apps/iphone-utilities/358868/split_bill_review.html, Nov. 9, 2009, 2 pages. (Year: 2009).*

(Continued)

*Primary Examiner* — Hani M Kazimi
*Assistant Examiner* — Hatem M Ali
(74) *Attorney, Agent, or Firm* — Schmeiser, Olsen & Watts, LLP

(57) ABSTRACT

A mobile device performs admixed transactions at a merchant. The mobile device receives a purchase amount. The mobile device connects to at least one other mobile device. Responsive to connecting to the at least one other mobile device, the mobile device receives account authorization for at least one other purchase amount. Responsive to receiving the account authorization from the at least one other device, the mobile device creates an admixed authorization. The admixed authorization comprises individual account authorizations for users of the mobile device and the at least one other mobile device. The mobile device initiates a single transaction at a merchant. The mobile device transfers the admixed authorization to the merchant. Each of the individual account authorizations are applied to the single transaction based on the purchase amount and the at least one other purchase amount authorized in the individual account authorizations.

21 Claims, 6 Drawing Sheets

(58) Field of Classification Search
USPC .................................................. 705/40–44
See application file for complete search history.

(56) References Cited

U.S. PATENT DOCUMENTS

| | | | |
|---|---|---|---|
| 2008/0208741 A1* | 8/2008 | Arthur | G06Q 20/105 705/41 |
| 2009/0191811 A1* | 7/2009 | Griffin | G06Q 20/322 455/41.1 |
| 2009/0239512 A1 | 9/2009 | Hammad et al. | |
| 2010/0274722 A1* | 10/2010 | Roberts | G06Q 20/10 705/44 |
| 2012/0028579 A1 | 2/2012 | Fine et al. | |
| 2012/0221464 A1* | 8/2012 | Pasquero | H04L 63/0492 705/39 |
| 2013/0006776 A1* | 1/2013 | Miller | G06Q 20/3276 705/14.65 |

FOREIGN PATENT DOCUMENTS

| | | |
|---|---|---|
| KR | 20050018895 A | 2/2005 |
| WO | 2010033968 A1 | 3/2010 |
| WO | 2010115889 A1 | 10/2010 |

OTHER PUBLICATIONS

"Split the Bill Smartphone Edition," Mobile Tech Review, http://store.handango.com/ampp/store/PlatformProductDetail.jsp?siteID, Nov. 6, 2011, 3 pages. (Year: 2011).*

"WujWuj," CrunchBase.com, http://www.crunchbase.com/company/wujwuj, accessed Jun. 15, 2012, 1 page. (Year: 2012).*

"Know Your Cell—Split Bill Review," http://www.knowyourcell.com/app-reviews/iphone-apps/iphone-utilities/358868/split_bill_review.html, Nov. 9, 2009, 2 pages.

"Split the Bill Smartphone Edition," Mobile Tech Review, http://store.handango.com/ampp/store/PlatformProductDetail.jsp?siteID, Nov. 6, 2011, 3 pages.

"WujWuj," CrunchBase.com, http://www.crunchbase.com/company/wujwuj, accessed Jun. 15, 2012, 1 page.

China Patent Office Action dated Apr. 25, 2016, 201310247523.1, 6 pages.

* cited by examiner

FIG. 2
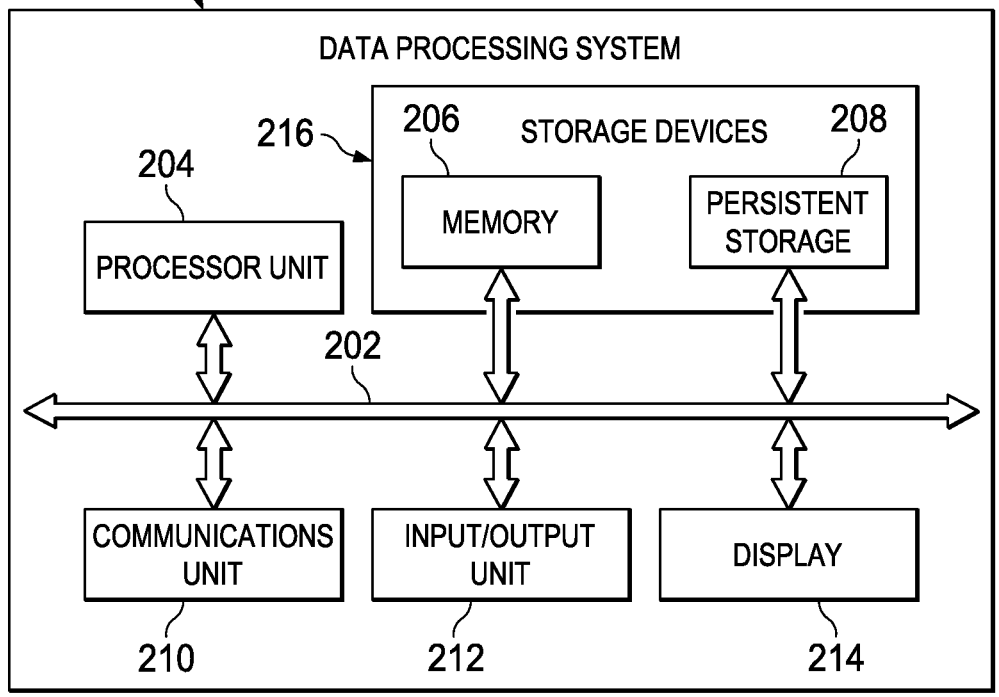
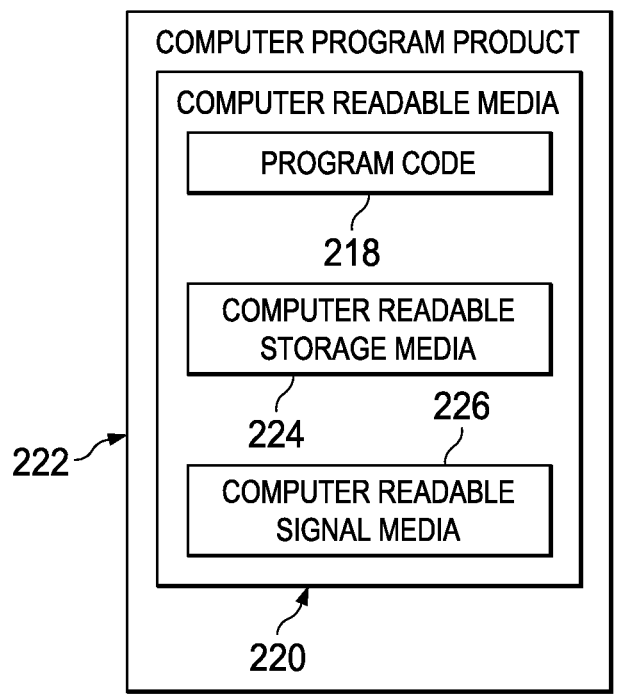

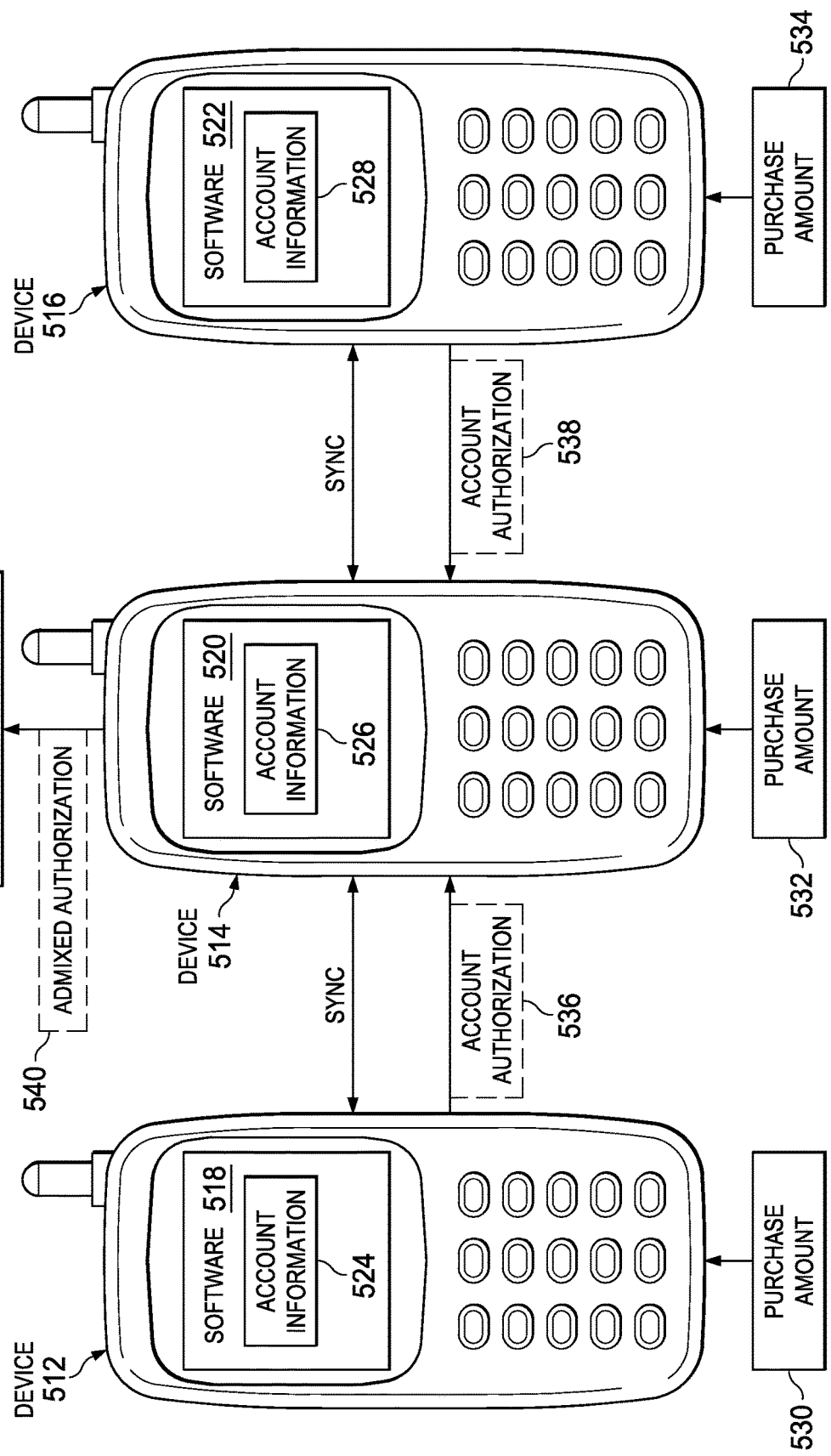

TRANSACTION MANAGEMENT BASED ON INDIVIDUAL ORDERS OR NUMBER OF DEVICES AT TABLE FOR DESIRED DISTRIBUTION

BACKGROUND

1. Field

The disclosure relates generally to a computer implemented method, computer program product and data processing system for effectuating mobile commerce. More specifically, the disclosure relates generally to a computer implemented method, computer program product and data processing system for and more specifically to admixing mobile commerce transactions to a single device.

2. Description of the Related Art

The makers of mobile communication devices, including those of cellular telephones, are increasingly adding functionality to their devices. For example, cellular telephones include features such as still and video cameras, video streaming and two-way video calling, email functionality, Internet browsers, music players, FM radios with stereo audio, and organizers. Cellular telephones in particular are becoming more than simply mobile communication devices. They are evolving into powerful tools for information management.

Mobile commerce (m-commerce) is yet another functionality being incorporated into the operations of mobile communication devices. Mobile commerce refers to transactions using a wireless device and data connection that result in the transfer of value in exchange for information, services, or goods. Protocols such as Near field communication (NFC), Bluetooth, radio frequency identification (RFID), personal area network (PAN), as well as Internet capabilities, can enable mobile communication devices such as cellular telephones and PDAs to carry out financial transactions. Mobile commerce, facilitated generally by mobile communication devices, can include services such as banking, payment, and ticketing. Accordingly, mobile communication devices may replace traditional wallets and credit cards. The emerging technology behind m-commerce may transform the mobile communication device into an electronic wallet.

Mobile communication device users can finalize a transaction to pay for items or services when their mobile communication device comes within range of a point-of-sale (POS) terminal. However, prior to finalization of a transaction there may be several manual steps required to be done by the user. For finalization of a transaction, the mobile communication device may communicate with the POS terminal via an RFID reader including an NFC microchip and RFID tag pair. The POS terminal can send an inquiry to the microchip of the device, which can send a serial number and a single-use cryptogram. The POS terminal then can send the two pieces of data to its bank, which can then forward them on to the user's bank for verification and approval. The user's mobile communication device's microchip can emulate an e-wallet, credit card or the like or other type of account the user specifies.

SUMMARY

According to one embodiment of the present invention, a computer implemented method is provided for performing admixed transactions at a merchant using a mobile device. The mobile device receives a purchase amount. The mobile device connects to at least one other mobile device. Responsive to connecting to the at least one other mobile device, the mobile device receives account authorization for at least one other purchase amount. Responsive to receiving the account authorization from the at least one other device, the mobile device creates an admixed authorization. The admixed authorization comprises individual account authorizations for users of the mobile device and the at least one other mobile device. The mobile device initiates a single transaction at a merchant. The mobile device transfers the admixed authorization to the merchant. Each of the individual account authorizations are applied to the single transaction based on the purchase amount and the at least one other purchase amount authorized in the individual account authorizations.

According to one embodiment of the present invention, a computer system, is provided for performing admixed transactions at a merchant using a mobile device. The computer system receives a purchase amount. The computer system connects to at least one other mobile device. Responsive to connecting to the at least one other mobile device, the computer system receives account authorization for at least one other purchase amount. Responsive to receiving the account authorization from the at least one other device, the computer system creates an admixed authorization. The admixed authorization comprises individual account authorizations for users of the mobile device and the at least one other mobile device. The computer system initiates a single transaction at a merchant. The computer system transfers the admixed authorization to the merchant. Each of the individual account authorizations are applied to the single transaction based on the purchase amount and the at least one other purchase amount authorized in the individual account authorizations.

According to one embodiment of the present invention, a computer program product is provided for performing admixed transactions at a merchant using a mobile device. The computer program product includes instructions for receiving a purchase amount. The mobile device connects to at least one other mobile device. The computer program product includes instructions, responsive to connecting to the at least one other mobile device, for receiving account authorization for at least one other purchase amount. The computer program product includes instructions, responsive to receiving the account authorization from the at least one other device, for creating an admixed authorization. The admixed authorization comprises individual account authorizations for users of the mobile device and the at least one other mobile device. The computer program product includes instructions for initiating a single transaction at a merchant. The computer program product includes instructions for transferring the admixed authorization to the merchant. Each of the individual account authorizations are applied to the single transaction based on the purchase amount and the at least one other purchase amount authorized in the individual account authorizations.

BRIEF DESCRIPTION OF THE SEVERAL VIEWS OF THE DRAWINGS

FIG. 2 is an illustration of a data processing system in accordance with an illustrative embodiment;

FIG. 5 is a data flow for aggregating admixed payments according to an illustrative embodiment;

DETAILED DESCRIPTION

Figure 1:
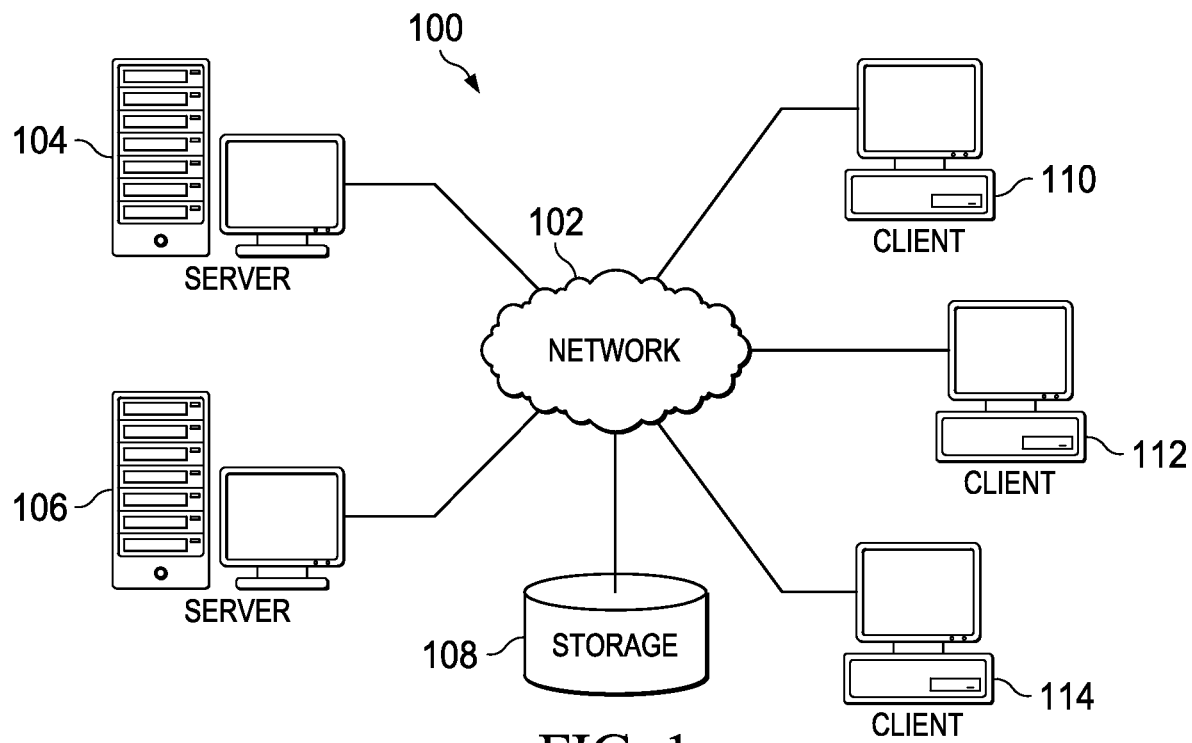
FIG. 1 is an illustrative diagram of a data processing environment in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an illustrative embodiment. In this illustrative example, data processing system 200 includes communications framework 202, which provides communications between processor unit 204, memory 206, persistent storage 208, communications unit 210, input/output (I/O) unit 212, and display 214. In these examples, communications frame work 204 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

Figure 3:
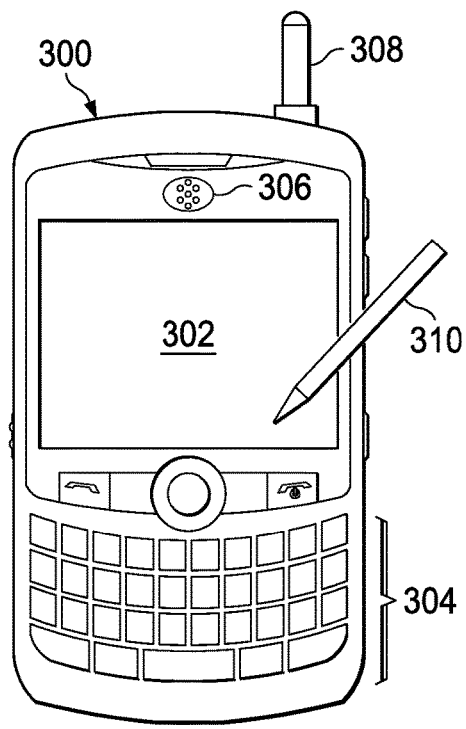
FIG. 3 is a diagram of a client in the form of a personal digital assistant (PDA) in accordance with a preferred embodiment of the present invention.

With reference now to FIG. 3, a diagram of a client in the form of a personal digital assistant (PDA) is depicted in accordance with a preferred embodiment of the present invention. PDA 300 includes a display 302 for presenting textual and graphical information. Display 302 may be a known display device, such as a liquid crystal display (LCD) device. The display may be used to present a map or directions, calendar information, a telephone directory, or an electronic mail message. In these examples, screen 302 may receive user input using an input device such as, for example, stylus 310.

PDA 300 may also include keypad 304, speaker 306, and antenna 308. Keypad 304 may be used to receive user input in addition to using screen 302. Speaker 306 provides a mechanism for audio output, such as presentation of an audio file. Antenna 308 provides a mechanism used in establishing a wireless communications link between PDA 300 and a network, such as network 202 in FIG. 2.

PDA 300 also preferably includes a graphical user interface that may be implemented by means of systems software residing in computer readable media in operation within PDA 300.

Figure 4:
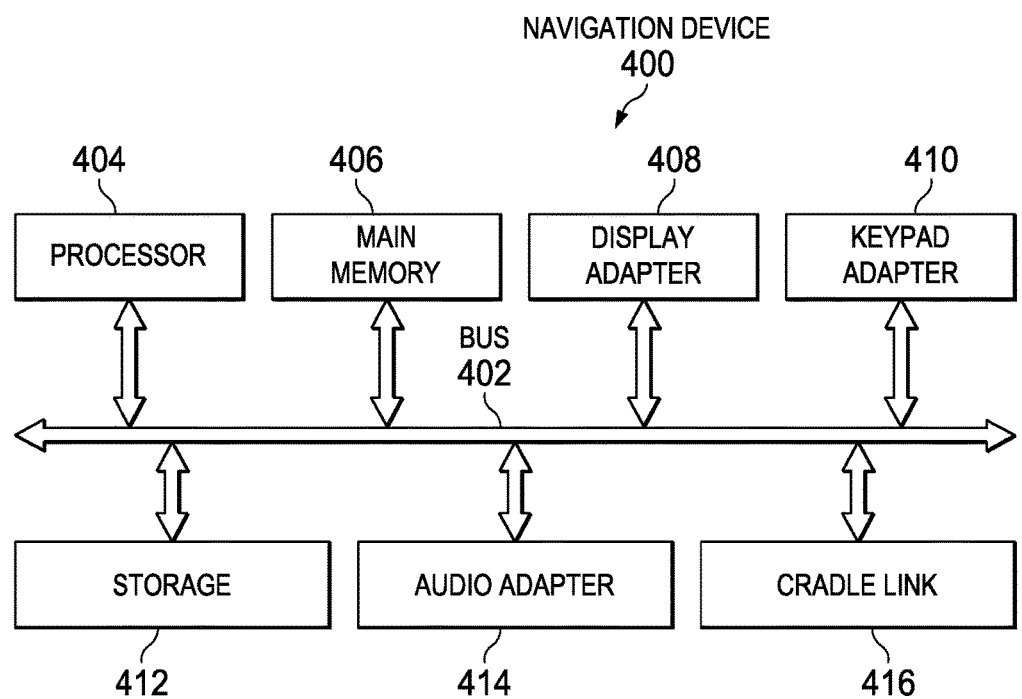
FIG. 4 is a block diagram of a PDA in accordance with a preferred embodiment of the present invention.

Turning now to FIG. 4, a block diagram of a PDA is shown in accordance with a preferred embodiment of the present invention. PDA 400 is an example of a PDA, such as PDA 300 in FIG. 3, in which code or instructions implementing the processes of the present invention may be located. PDA 400 includes a bus 402 to which processor 404 and main memory 406 are connected. Display adapter 608, keypad adapter 410, storage 412, and audio adapter 414 also are connected to bus 402. Cradle link 416 provides a mechanism to connect PDA 400 to a cradle used in synchronizing data in PDA 400 with another data processing system. Further, display adapter 408 also includes a mechanism to receive user input from a stylus when a touch screen display is employed.

An operating system runs on processor 404 and is used to coordinate and provide control of various components within PDA 400 in FIG. 4. The operating system may be, for example, a commercially available operating system such as Windows CE, which is available from Microsoft Corporation. Instructions for the operating system and applications or programs are located on storage devices, such as storage 412, and may be loaded into main memory 406 for execution by processor 404.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

Illustrative embodiments of the present invention provide a computer implemented method, computer system, and computer program product for performing admixed transactions at a merchant using a mobile device. The mobile device receives a purchase amount. The mobile device connects to at least one other mobile device. Responsive to connecting to the at least one other mobile device, the mobile device receives account authorization for at least one other purchase amount. Responsive to receiving the account authorization from the at least one other device, the mobile device creates an admixed authorization. The admixed authorization comprises individual account authorizations for users of the mobile device and the at least one other mobile device. The mobile device initiates a single transaction at a merchant. The mobile device transfers the admixed authorization to the merchant. Each of the individual account authorizations are applied to the single transaction based on the purchase amount and the at least one other purchase amount authorized in the individual account authorizations.

Referring now to FIG. 5, a data flow is shown for aggregating admixed payments according to an illustrative embodiment. Each of device 512, device 514, and device 516 can be, for example, a server, a personal digital assistant (PDA), or a smart phone. In one illustrative embodiment, each of device 512, device 514, and device 516 is a personal digital assistant, such as personal digital assistant (PDA) 300 of FIG. 3.

Device 512 runs payment amalgamation software 518. Device 514 runs payment amalgamation software 520. Device 516 runs payment amalgamation software 522. Each of payment amalgamation software 518 is a software application that can synchronize with other devices, and transfer to and receive from those devices account authorizations and order identifications.

Payment amalgamation software 518 includes or receives account information 524. Payment amalgamation software 520 includes or receives account information 526. Payment amalgamation software 522 includes or receives account information 528. Each of account information 524, account information 526, and account information 528 is an identification of a particular monetary or credit account against which a user can make purchases. Each of account information 524, account information 526, and account information 528 can include, for example but not limited to, a name of the owner of the account, an account number, a personal identification number, an expiration date of the account, and a credit security code. A credit security code is also known as a credit verification code, or a credit verification value. In one illustrative embodiment, payment amalgamation software can facilitate multiple transactions by persistently storing account information. In one illustrative embodiment, payment amalgamation software only utilizes account information to facilitate a single transaction, requiring a user is required to reenter account information for each subsequent transaction.

Payment amalgamation software 518 receives purchase amount 530 from a user. Payment amalgamation software 520 receives purchase amount 532 from a user. Payment amalgamation software 522 receives purchase amount 534 from a user. Each of purchase amount 530, purchase amount 532, and purchase amount 534 is an amount or item selection that can be charged utilizing the associated one of account information 524, account information 526, and account information 528. In one illustrative embodiment, a user can directly enter into payment amalgamation software an amount to be charged. In one illustrative embodiment, a user can make an online menu or catalog selection of a particular good or service offered by a merchant. Payment amalgamation software can then retrieve the price of the selected good from the online menu or catalog.

Device 512 and device 516 securely connect to device 514 utilizing a known connection type. In one illustrative embodiment, device 512 and device 516 connect to device 514 utilizing a personal area network connection, such as for example, a Bluetooth® connection. Once connected, device 512 transfers account authorization 536 to device 512, and device 514 transfers account authorization 538 to device 512. Account authorization 536 includes account information 524 and purchase amount 530. Account authorization 538 includes account information 528 and purchase amount 534.

Device 514 combines account authorization 536 and account authorization 538 with account information 526 and purchase amount 532 to create Admixed authorization 540. Admixed authorization 540 is a data structure that contains account authorizations and purchase amounts for different accounts, such as for device 514, as well as devices synced to device 514, such as device 512 and device 516.

In one illustrative embodiment, Admixed authorization 540 is a single use authorization. Thus, once Admixed authorization 540 is used to make a purchase, Admixed authorization 540 is deleted from device 514. Furthermore, any account authorization, account information, and purchase amounts received from other devices, such as account authorization 536, account authorization 538, account information 524, account information 528, purchase amount 530 and purchase amount 534, is also deleted.

In one illustrative embodiment, a timer is associated with one or more of the account authorization 536, account information 524, purchase amount 530, account authorization 538, account information 528, and purchase amount 534. The timer is set when information is transferred to device 514. At the expiration of the timer, or the elapse of a predetermined time, information transferred to device 514 expires. Admixed authorization 540 is deleted from device 514. Furthermore, any account authorization, account information, and purchase amounts received from other devices, such as account authorization 536, account authorization 538, account information 524, account information 528, purchase amount 530 and purchase amount 534, is also deleted. Thus, account authorization, account information, and purchase amounts received from other devices cannot be held indefinitely. If a transaction cannot be completed prior to the expiration of the timer, then the account authorization, account information, and purchase amounts received from other devices is deleted to prevent misuse or dissemination of such account authorization, account information, and purchase amounts received from other devices.

From the perspective of the merchant and the user of device 514, a single transaction for the goods and services is performed when user of device 514 subsequently pays for goods and services at merchant 542. Instead of entering separate transactions for each of account authorization 534, account authorization 536, and account authorization 538, payment amalgamation software 520 simply transfers Admixed authorization 540 from device 514 to corresponding software 546 executing on data processing system 544 of merchant 542. Corresponding software 546 executing on data processing system 544 can then apply each of account authorization 534, account authorization 536, and account authorization 538 to the single transaction. In one illustrative embodiment, admixed authorization 540 can be provided to merchant 542 in the form of one or more barcodes, quick response codes (QR code) or other optical machine-readable representations of data that can be displayed on device 514. When a plurality of barcodes are utilized, device 514 displays each barcode so that a merchant 542 using data processing system 544 can individually scan each of the plurality of barcodes displayed on device 514. When a single bar code is utilized, device 514 creates a single barcode that represents that is an admix of each account authorization from device 512, device 514, and device 516. Merchant 542 using data processing system 544 can then scan the single barcode displayed on device 514, distinguishing the individual account authorizations therefrom.

Figure 6:
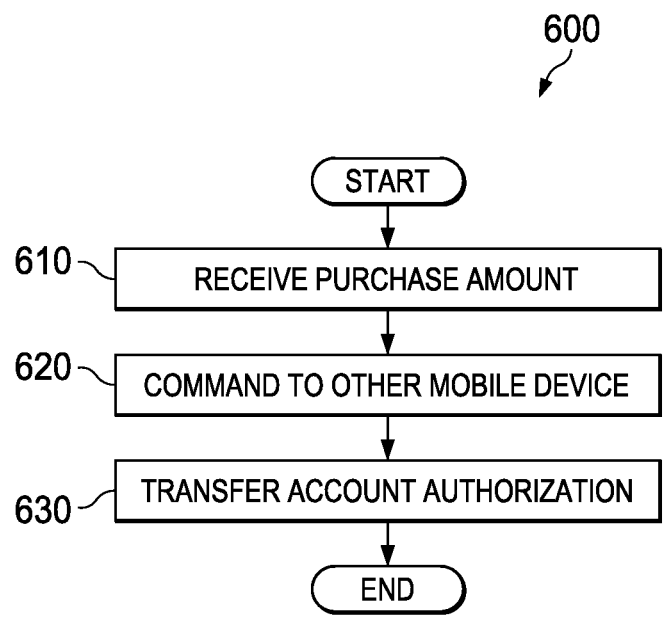
FIG. 6 is a flowchart of a process for transferring account authorization from one device to another device.

Referring now to FIG. 6, a flowchart is shown for transferring account authorization from one device to another device. Process 600 is a software process, executing on a software component, such as payment amalgamation software 518 or payment amalgamation software 522 of FIG. 5.

Process 600 begins by receiving a purchase amount (step 610). The purchase amount can be purchase amount 530 purchase amount or purchase amount 534 of FIG. 5. The purchase amount is an amount or item selection that can be charged utilizing the associated account information. In one illustrative embodiment, process 600 receives the purchase amount directly from a user entering an amount to be charged into process 600. In one illustrative embodiment, process 600 receives the purchase amount from a user selection of an online menu or catalog selection of a particular good or service offered by a merchant, from which process 600 can retrieve the price of the selected good.

Process 600 then connects to another device (step 620). Process 600 can connect to a device such as device 514 of FIG. 5, utilizing a known connection type. In one illustrative embodiment, process 600 connects to the other device utilizing a personal area network connection, such as for example, a Bluetooth® connection.

Responsive to connecting to the other device, process 600 transfers account authorization to the other device (step 630), with the process terminating thereafter. The account authorization includes account information and purchase amount. The account information is an identification of a particular monetary or credit account against which a user can make purchases, and can be account information 524 or 528 of FIG. 5. The account information can include, for example but not limited to, a name of the owner of the account, an account number, a personal identification number, an expiration date of the account, and a credit security code. A credit security code is also known as a credit verification code, or a credit verification value.

Figure 7:
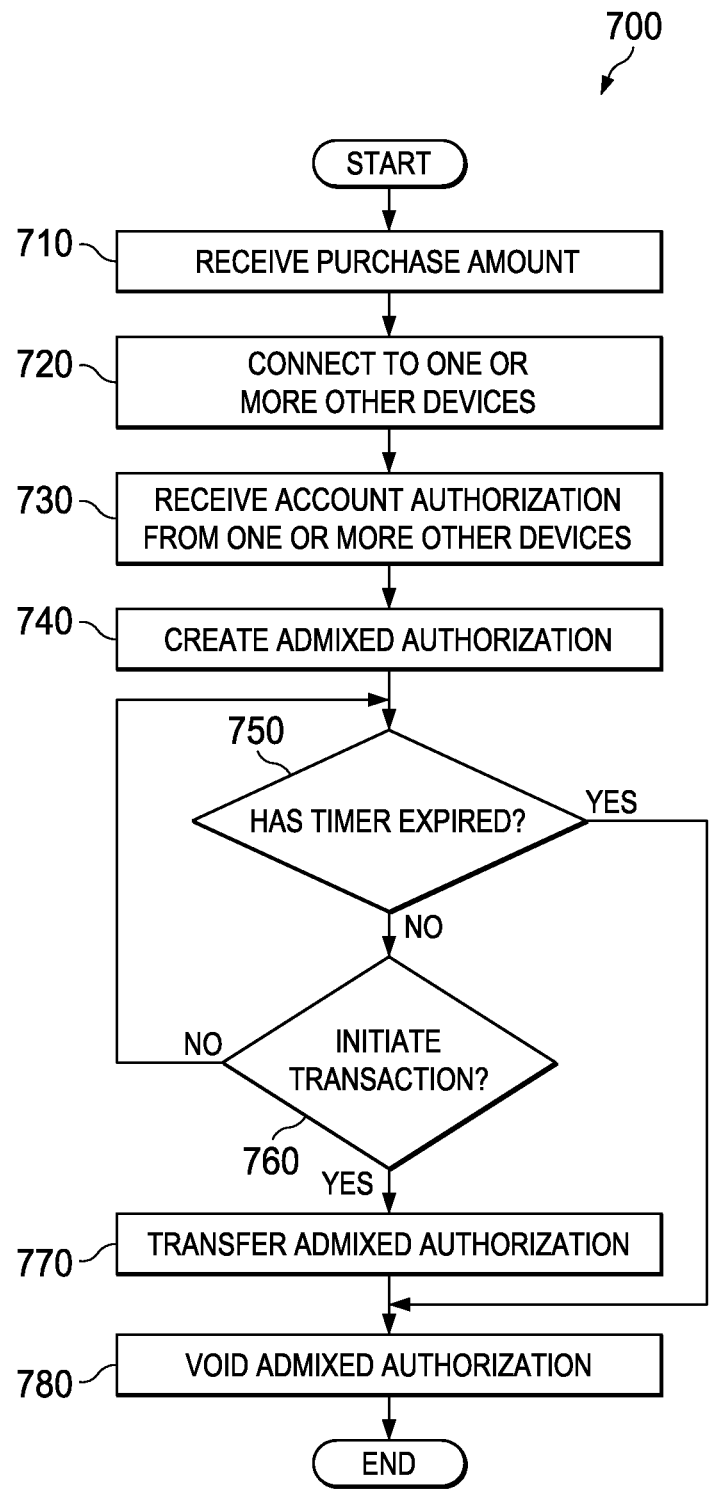
FIG. 7 is a flowchart of a process for a transaction utilizing an admixed authorization.

Referring now to FIG. 7, a flowchart is shown for a transaction utilizing an admixed authorization. Process 700 is a software process, executing on a software component, such as payment amalgamation software 524 of FIG. 5.

Process 700 begins by receiving a purchase amount (step 710). The purchase amount can be purchase amount 532 of FIG. 5. The purchase amount is an amount or item selection that can be charged utilizing the associated account information. In one illustrative embodiment, process 700 receives the purchase amount directly from a user entering an amount to be charged into process 700. In one illustrative embodiment, process 700 receives the purchase amount from a user selection of an online menu or catalog selection of a particular good or service offered by a merchant, from which process 700 can retrieve the price of the selected good.

Process 700 then connects to one or more other devices (step 720). Process 700 can connect to a device such as device 512 and device 516 of FIG. 5, utilizing a known connection type. In one illustrative embodiment, process 600 connects to the other device utilizing a personal area network connection, such as for example, a Bluetooth® connection.

Responsive to connecting to the other device, process 700 receives account authorization from the one or more other devices (step 730). The account authorization includes account information and purchase amount. The account information is an identification of a particular monetary or credit account against which a user can make purchases, and can be account information 524 or 528 of FIG. 5. The account information can include, for example but not limited to, a name of the owner of the account, an account number, a personal identification number, an expiration date of the account, and a credit security code. A credit security code is also known as a credit verification code, or a credit verification value.

Responsive to receiving the account authorization from the one or more other devices, process 700 creates an Admixed authorization (step 740). The Admixed authorization can be Admixed authorization 540. The Admixed authorization is a data structure that contains account authorizations and purchase amounts for multiple accounts.

Process 700 then determines whether any timer associated with the Admixed authorization has expired (step 750). Account authorization, account information, and purchase amounts received from other devices is not held indefinitely. Thus, in one illustrative embodiment, process 700 associates a timer with the Admixed authorization. If a transaction cannot be completed prior to the expiration of the timer, then the account authorization, account information, and purchase amounts received from other devices is deleted to prevent misuse or dissemination of such account authorization, account information, and purchase amounts received from other devices. Responsive to determining that the timer has expired ("yes" at step 750), process 700 proceeds to step 780 and voids the Admixed authorization (step 780). The Admixed authorization is deleted. Furthermore, any account authorization, account information, and purchase amounts received by process 700 from other devices is also deleted.

Returning now to step 750, responsive to determining that the timer has not expired ("no" at step 750), process 700 identifies whether a transaction is initiated (step 760). If a transaction is not initiated ("no" at step 760), process 700 iterates back to step 750. If a transaction is initiated ("yes" at step 760), process 700 transfers the Admixed authorization to corresponding software executing on a data processing system of a merchant (step 770). The corresponding software can then apply each of individual account authorization of the Admixed authorization to a single transaction.

Responsive to transferring the Admixed authorization to corresponding software, process 700 voids the Admixed authorization (step 780), with the process terminating thereafter. The Admixed authorization is a single use authorization. Thus, once the Admixed authorization is used to make a purchase, process 700 deletes Admixed authorization. Furthermore, process 700 also deletes any account authorization, account information, and purchase amounts received from other devices.

Figure 8:
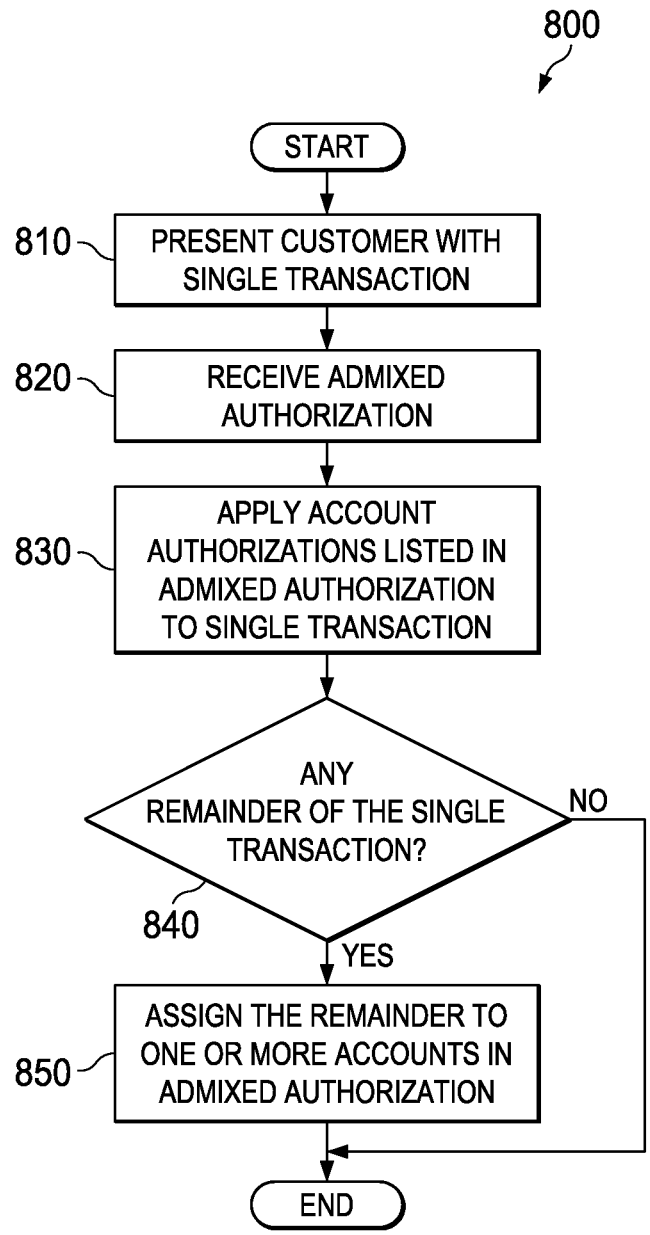
FIG. 8 is a process for applying an admixed authorization to a single transaction according to an illustrative embodiment.

Referring now to FIG. 8, a process for applying an admixed authorization to a single transaction is shown according to an illustrative embodiment. Process 800 is a software process, executing on a software component, such as corresponding software 546 of FIG. 5.

Process 800 begins by presenting a customer with a single transaction (step 810). The single transaction can include one or more goods or services to be purchased from a merchant. However, the single transaction is presented to customer as a summed total of the price of all of the one or more goods or services to be purchased.

Responsive to presenting a customer with a single transaction, process 800 receives an Admixed authorization (step 820). The Admixed authorization can be Admixed authorization 540. The Admixed authorization is a data structure that contains account authorizations and purchase amounts corresponding to multiple accounts.

Responsive to receiving the Admixed authorization, process 800 applies the account authorizations listed in the Admixed authorization to the single transaction (step 830). That is, each account information listed in the Admixed authorization is applied to the single transaction for the associated purchase amount.

Process 800 can then determine if there is any remainder of the single transaction (step 840). The remainder is any amount of the single transaction in excess of the sum of the purchase amounts. If there is no remainder ("no" at step 840), then process 800 terminates. If there is a remainder, then process 800 can perform a remedial action (step 850). The remedial action can assign the remainder to one or more of the accounts in the Admixed authorization.

Thus, illustrative embodiments of the present invention provide a computer implemented method, computer system, and computer program product for performing admixed transactions at a merchant using a mobile device. The mobile device receives a purchase amount. The mobile device connects to at least one other mobile device. Responsive to connecting to the at least one other mobile device, the mobile device receives account authorization for at least one other purchase amount. Responsive to receiving the account authorization from the at least one other device, the mobile device creates an admixed authorization. The admixed authorization comprises individual account authorizations for users of the mobile device and the at least one other mobile device. The mobile device initiates a single transaction at a merchant. The mobile device transfers the admixed authorization to the merchant. Each of the individual account authorizations are applied to the single transaction based on the purchase amount and the at least one other purchase amount authorized in the individual account authorizations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claims are as follows:

1. A method for creating, by mobile commerce via the Internet, an admixed transaction, said method comprising:
  receiving, via the Internet, by a third mobile device from a first mobile device and a second mobile device while the first mobile device and the second mobile device are securely connected to the third mobile device, a first account authorization for a first purchase of a first good or service and a second account authorization for a second purchase of a second good or service, respectively, wherein the first account authorization comprises (i) a first purchase amount for the first purchase by a first user of the first mobile device and (ii) a first account number associated with the first purchase, wherein the second account authorization comprises (iii) a second purchase amount for the second purchase by a second user of the second mobile device and (iv) a second account number associated with the second purchase, wherein the first, second and third mobile devices are different mobile devices configured to communicate with one another via the Internet, wherein the first and second users are different users, wherein the first and second purchases are independent purchases by the first and second users, respectively, wherein the first and second account numbers are different account numbers, and wherein the third mobile device is a hardware device;
  responsive to said receiving the first and second account authorizations from the first and second mobile devices, respectively, said third mobile device creating an admixed authorization, wherein the admixed authorization is a data structure that comprises the first and second account authorizations, and wherein the admixed authorization is a single use authorization for subsequently implementing, at a data processing system of a single merchant, a single transaction for the first and second good or service, said single transaction comprising the first and second independent purchases by the first and second users and associated with the first and second account, respectively;
  after said creating the admixed authorization, said third mobile device ascertaining whether or not a timer associated with the admixed authorization has expired;
  if said ascertaining ascertains that the timer associated with the admixed authorization has not expired, then said third mobile device transferring, via the Internet, the admixed authorization to the data processing system of the single merchant;
  if said ascertaining ascertains that the timer associated with the admixed authorization has expired, then said third mobile device voiding the admixed authorization.

2. The method of claim 1, wherein said ascertaining ascertains that the timer associated with the admixed authorization has not expired.

3. The method of claim 1, wherein said ascertaining ascertains that the timer associated with the admixed authorization has expired.

4. The method of claim 1,
  wherein the first account authorization comprises first account information comprising a name of an owner of a first account having the first account number, a first personal identification number, an expiration date of the first account, and a first credit security code, and wherein the second account authorization comprises second account information comprising a name of an owner of a second account having the second account number, a second personal identification number, an expiration date of the second account, and a second credit security code.

5. The method of claim 1, wherein the method further comprises:
responsive to said transferring the admixed authorization to the data processing system of the single merchant, said third mobile device deleting the admixed authorization.

6. The method of claim 1, wherein the third mobile device is a smart phone or a personal digital assistant (PDA).

7. The method of claim 1, wherein all method steps performed by the third mobile device are performed by an application specific integrated circuit (ASIC) on which said all method steps performed by the third mobile device are encoded.

8. A computer program product, comprising a computer readable storage device having computer readable program code stored therein, said program code containing instructions which, upon being executed by a processor, implement a method for creating, by mobile commerce via the Internet, an admixed transaction, said method comprising:
receiving, via the Internet, by a third mobile device from a first mobile device and a second mobile device while the first mobile device and the second mobile device are securely connected to the third mobile device, a first account authorization for a first purchase of a first good or service and a second account authorization for a second purchase of a second good or service, respectively, wherein the first account authorization comprises (i) a first purchase amount for the first purchase by a first user of the first mobile device and (ii) a first account number associated with the first purchase, wherein the second account authorization comprises (iii) a second purchase amount for the second purchase by a second user of the second mobile device and (iv) a second account number associated with the second purchase, wherein the first, second and third mobile devices are different mobile devices configured to communicate with one another via the Internet, wherein the first and second users are different users, wherein the first and second purchases are independent purchases by the first and second users, respectively, wherein the first and second account numbers are different account numbers, and wherein the third mobile device is a hardware device;
responsive to said receiving the first and second account authorizations from the first and second mobile devices, respectively, said third mobile device creating an admixed authorization, wherein the admixed authorization is a data structure that comprises the first and second account authorizations, and wherein the admixed authorization is a single use authorization for subsequently implementing, at a data processing system of a single merchant, a single transaction for the first and second good or service, said single transaction comprising the first and second independent purchases by the first and second users and associated with the first and second account, respectively;
after said creating the admixed authorization, said third mobile device ascertaining whether or not a timer associated with the admixed authorization has expired;
if said ascertaining ascertains that the timer associated with the admixed authorization has not expired, then said third mobile device transferring, via the Internet, the admixed authorization to the data processing system of the single merchant;
if said ascertaining ascertains that the timer associated with the admixed authorization has expired, then said third mobile device voiding the admixed authorization.

9. The computer program product of claim 8, wherein said ascertaining ascertains that the timer associated with the admixed authorization has not expired.

10. The computer program product of claim 8, wherein said ascertaining ascertains that the timer associated with the admixed authorization has expired.

11. The computer program product of claim 8,
wherein the first account authorization comprises first account information comprising a name of an owner of a first account having the first account number, a first personal identification number, an expiration date of the first account, and a first credit security code, and
wherein the second account authorization comprises second account information comprising a name of an owner of a second account having the second account number, a second personal identification number, an expiration date of the second account, and a second credit security code.

12. The computer program product of claim 8, wherein the method further comprises:
responsive to said transferring the admixed authorization to the data processing system of the single merchant, said third mobile device deleting the admixed authorization.

13. The computer program product of claim 8, wherein the third mobile device is a smart phone or a personal digital assistant (PDA).

14. The computer program product of claim 8, wherein all method steps performed by the third mobile device are performed by an application specific integrated circuit (ASIC) on which said all method steps performed by the third mobile device are encoded.

15. A system comprising a processor, a memory coupled to the processor, and a computer readable storage device coupled to the processor, said storage device containing program code which, upon being executed by the processor via the memory, implements a method for creating, by mobile commerce via the Internet, an admixed transaction, said method comprising:
receiving, via the Internet, by a third mobile device from a first mobile device and a second mobile device while the first mobile device and the second mobile device are securely connected to the third mobile device, a first account authorization for a first purchase of a first good or service and a second account authorization for a second purchase of a second good or service, respectively, wherein the first account authorization comprises (i) a first purchase amount for the first purchase by a first user of the first mobile device and (ii) a first account number associated with the first purchase, wherein the second account authorization comprises (iii) a second purchase amount for the second purchase by a second user of the second mobile device and (iv) a second account number associated with the second purchase, wherein the first, second and third mobile devices are different mobile devices configured to communicate with one another via the Internet, wherein the first and second users are different users, wherein the first and second purchases are independent purchases by the first and second users, respectively, wherein the first and second account numbers are different account numbers, and wherein the third mobile device is a hardware device;

responsive to said receiving the first and second account authorizations from the first and second mobile devices, respectively, said third mobile device creating an admixed authorization, wherein the admixed authorization is a data structure that comprises the first and second account authorizations, and wherein the admixed authorization is a single use authorization for subsequently implementing, at a data processing system of a single merchant, a single transaction for the first and second good or service, said single transaction comprising the first and second independent purchases by the first and second users and associated with the first and second account, respectively;

after said creating the admixed authorization, said third mobile device ascertaining whether or not a timer associated with the admixed authorization has expired;

if said ascertaining ascertains that the timer associated with the admixed authorization has not expired, then said third mobile device transferring, via the Internet, the admixed authorization to the data processing system of the single merchant;

if said ascertaining ascertains that the timer associated with the admixed authorization has expired, then said third mobile device voiding the admixed authorization.

16. The system of claim 15, wherein said ascertaining ascertains that the timer associated with the admixed authorization has not expired.

17. The system of claim 15, wherein said ascertaining ascertains that the timer associated with the admixed authorization has expired.

18. The system of claim 15, wherein the first account authorization comprises first account information comprising a name of an owner of a first account having the first account number, a first personal identification number, an expiration date of the first account, and a first credit security code, and wherein the second account authorization comprises second account information comprising a name of an owner of a second account having the second account number, a second personal identification number, an expiration date of the second account, and a second credit security code.

19. The system of claim 15, wherein the method further comprises:

responsive to said transferring the admixed authorization to the data processing system of the single merchant, said third mobile device deleting the admixed authorization.

20. The system of claim 15, wherein the third mobile device is a smart phone or a personal digital assistant (PDA).

21. The system of claim 15, wherein all method steps performed by the third mobile device are performed by an application specific integrated circuit (ASIC) on which said all method steps performed by the third mobile device are encoded.

* * * * *